US006612032B1

(12) United States Patent
Murthy et al.

(10) Patent No.: US 6,612,032 B1
(45) Date of Patent: Sep. 2, 2003

(54) MANUFACTURING METHOD FOR INK JET PEN

(75) Inventors: Ashok Murthy, Tualatin, OR (US); Richard Earl Corley, Jr., Lexington, KY (US); Kris Ann Reeves, Union, KY (US); Jeanne Marie Saldanha Singh, Lexington, KY (US); Paul Timothy Spivey, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/495,168

(22) Filed: Jan. 31, 2000

(51) Int. Cl.[7] .......................... B21D 53/76; B23P 17/00

(52) U.S. Cl. ...................... 29/890.1; 29/25.35; 29/832; 29/611; 347/20; 347/22; 347/39; 347/40; 347/44; 347/47; 156/66; 156/241; 156/275.1; 156/275.5

(58) Field of Search .............................. 29/25–35, 832, 29/890.1, 611; 347/20, 22, 40, 39, 44, 47, 49, 50, 87; 156/66, 241, 275.1, 275.5

(56) References Cited

U.S. PATENT DOCUMENTS 4,056,881 A 11/1977 Holt et al.
4,238,267 A 12/1980 Konstantin
4,388,128 A * 6/1983 Ogawa et al. ................ 156/64
4,500,895 A * 2/1985 Buck et al. ................... 347/87
4,594,961 A 6/1986 Beris et al.
4,762,983 A 8/1988 Oogita et al.
4,776,914 A 10/1988 Horikiri
4,946,708 A * 8/1990 Habich et al. ................ 427/96
4,953,287 A * 9/1990 West et al. ................... 29/611
4,959,008 A 9/1990 Wasulko
5,013,383 A 5/1991 Chapman
5,016,023 A * 5/1991 Chan et al. .................. 346/1.1
5,034,083 A * 7/1991 Campanelli et al. ..... 156/273.5
5,049,434 A 9/1991 Wasulko
5,084,713 A * 1/1992 Wong .......................... 347/18
5,226,993 A 7/1993 Tukakoshi et al.
5,252,166 A 10/1993 Krawczyc
5,288,358 A 2/1994 Logan
5,368,683 A 11/1994 Altavela et al.
5,375,326 A 12/1994 Usui et al.
5,383,996 A 1/1995 Dressler
5,439,956 A 8/1995 Noguchi
5,450,113 A 9/1995 Childers et al.
5,514,240 A 5/1996 Hagiiiri-Teiirani et al.
5,537,133 A * 7/1996 Marler et al. ................. 347/18
5,565,900 A * 10/1996 Cowger et al. ............... 347/42
5,573,621 A 11/1996 Boreali
5,599,416 A 2/1997 Kuwahara
5,644,347 A * 7/1997 Schwiebert et al. .......... 347/33
5,736,998 A * 4/1998 Caren et al. .................. 347/45
5,751,323 A * 5/1998 Swanson et al. .............. 347/87
5,751,324 A * 5/1998 Brandon et al. .............. 347/87
6,190,002 B1 * 2/2001 Spivey ........................ 347/50
6,343,857 B1 * 2/2002 Cowger ....................... 347/89

* cited by examiner

Primary Examiner—A. Dexter Tugbang
Assistant Examiner—Paul D Kim
(74) *Attorney, Agent, or Firm*—David LaRose; Jacqueline M. Daspit

(57) ABSTRACT

The invention relates to a method for attaching a semiconductor chip to an ink jet pen body and improved construction techniques therefor. According to the method a first adhesive have a cure time greater than about 15 minutes is dispensed in a predetermined pattern in one or more chip pockets of an ink jet pen body. Beads containing a second adhesive are dispensed in two or more discrete locations around an inside perimeter of each chip pocket. A semiconductor chip having chip edges is attached to the second adhesive in each of the chip pockets and the first adhesive is cured using heat or radiation. Use of a dual adhesive system improves the alignment of the semiconductor chips relative to one another until the first adhesive is completely cured.

12 Claims, 3 Drawing Sheets

MANUFACTURING METHOD FOR INK JET PEN

FIELD OF THE INVENTION

The invention relates to ink jet printers and in particular to methods for assembling ink jet pen components in order to maintain alignment of the components during assembly thereof.

BACKGROUND OF THE INVENTION

Ink jet printers are continually undergoing design changes to improve the speed and print quality produced by such printers in order to provide printed images which have the appearance of laser printed media. One important advantage of ink jet printers over that of laser printers is that multi-color images may be produced relatively less expensively than with laser printers. Multicolor images are produced by depositing dots of different colors in precise patterns on the print media. One of the difficulties associated with multi-color printing is that the printheads of the individual ink jet pens used to produce the images must be aligned with each other so that the dot placement errors or minimized. Exact alignment of all components during the assembly of an ink jet pen is extremely difficult to achieve. Even if the parts are initially aligned, it is difficult to maintain the alignment throughout the manufacturing process without the use of costly jigs. Even with elaborate alignment equipment, because of the size of the parts, extremely small alignment errors may have a major impact on the performance of the pens in a printer.

The manufacture of a multi-color ink jet is typically a multi-step process. The most common multicolor printer uses individual ink jet pens for each color of ink. The components of the pens including the printheads are aligned and assembled with respect to their pen bodies. The individual pens are then attached to a carriage in side by side relationship. Once the pens are attached to the carriage, the pens may be individually adjusted to provide the desired alignment between the different pen colors. The components of each of the pens are aligned with respect to reference marks on the pen bodies and alignment between the individual color pens is conducted after all of the components of the pens are assembled and attached to the carriage. A disadvantage of this method for aligning the ink jet pens is that multiple alignment steps are required for the individual pens and there is a possibility that misalignment may occur due to wear or damage thereby requiring another costly alignment step.

It is difficult to produce multicolor pens having two or more printheads attached to the same ink jet pen body because of the need to maintain component alignment until all of the adhesive materials used for attaching parts to the pen body are cured. There is a need therefore for manufacturing techniques which are helpful for improving the alignment between component parts of an ink jet pen.

SUMMARY OF THE INVENTION

With regard to the foregoing, the invention provides a method for attaching a semiconductor chip to an ink jet pen body which includes dispensing a first adhesive having a cure time greater than about 15 minutes in a predetermined pattern in one or more chip pockets of an ink jet pen body, dispensing beads containing a second adhesive in two or more discrete locations around an inside perimeter of each chip pocket. The second adhesive preferably has a substantially shorter cure time than the first adhesive. A semiconductor chip having chip edges is attached in each of the chip pockets to the second adhesive and the first adhesive is cured using heat or radiation.

In another aspect the invention provides a method for assembling a multi-color ink jet pen which includes providing an ink jet pen body containing two or more semiconductor chip pockets, dispensing a die attach adhesive in a predetermined pattern in each of the chip pockets, the die attach adhesive having a cure time greater than about 15 minutes, dispensing beads containing a second adhesive in two or more discrete locations around an inside perimeter of each chip pocket adjacent the die attach adhesive, the second adhesive having a cure time substantially shorter than the cure time of the die attach adhesive, attaching a semiconductor chip having chip edges in each of the chip pockets to the second adhesive, the semiconductor chips being attached to flexible circuits or TAB circuits, curing the second adhesive to hold the chips in a predetermined alignment, curing the first adhesive using heat or radiation, attaching the flexible circuits or TAB circuits to the ink jet pen body and attaching one or more removable cartridges containing ink to the pen body.

An advantage of the methods of the invention is that the second adhesive is effective to hold the individual semiconductor chips of a multicolor ink jet pen in alignment with respect to one another until the die attach adhesive is cured. Another advantage is that at least one of the adhesives may flow during the bonding and/or curing step to protect the edges of the semiconductor chips while the chips remain fixedly bonded to the ink jet pen body. The process also enables the chips to be aligned to each other at the same time the chips are bonded to the ink jet pen body thereby eliminating a separate step for aligning the chips to one another.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE INVENTION

Figure 1:
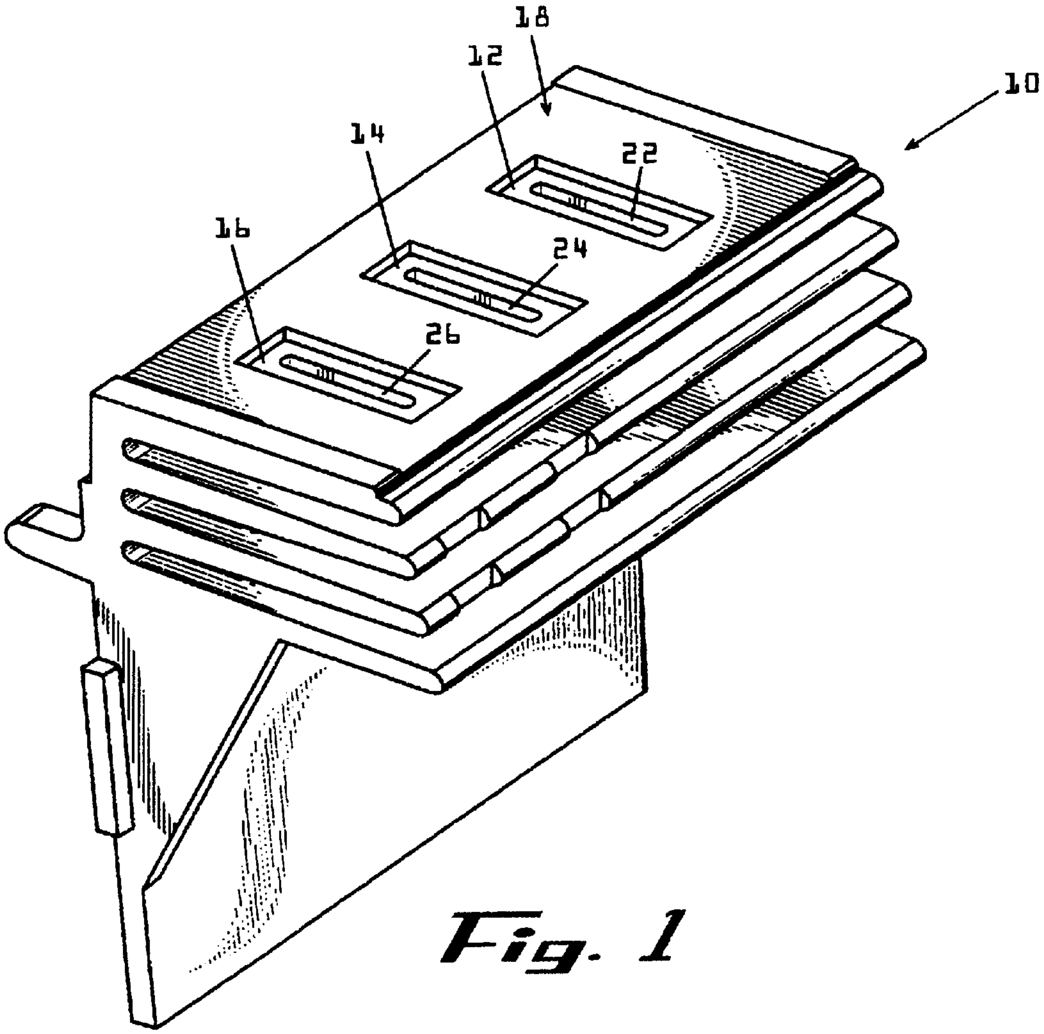
FIG. 1 is a perspective view of a multicolor ink jet pen body showing semiconductor chip pockets therein.
Figure 2:
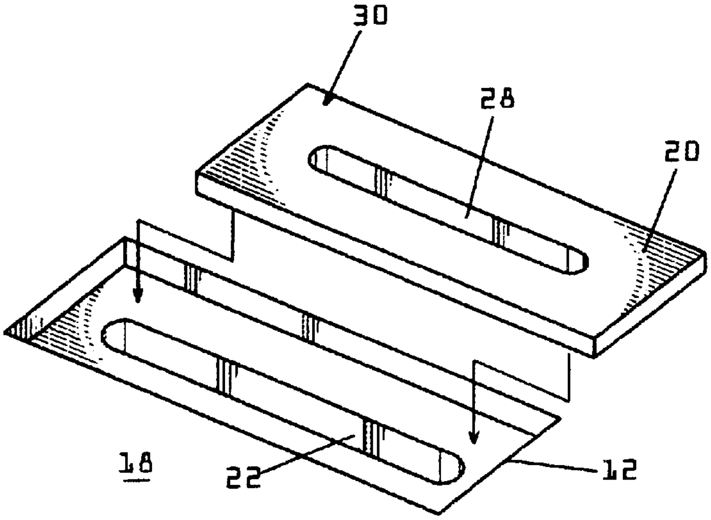
FIG. 2 is a perspective view of a single chip pocket and semiconductor chip for placement therein.

With reference to FIGS. 1 and 2 there is shown in perspective view a multicolor ink jet pen body 10 containing chip pockets 12, 14 and 16 on a first surface 18 thereof for the colors cyan, magenta and yellow. In the alternative, the pen body 10 may contain from two to four chip pockets, preferably, the pen body 10 contains from three to four chip pockets, the fourth chip pocket being adapted for the color black.

The chip pockets 12, 14 and 16 are recessed from the first surface 18 so that the semiconductor chips 20 do not extend above the top surface 18 of the pen body 10. Each of the chip pockets 12, 14 and 16 contain ink feed slots such as slots 22, 24 and 26 for feed of ink to the chips 20. The semiconductor chips 20 contain an ink via 28 therein for ink flow communication between ink in the ink feed slots and a top surface 30 of the chips containing energy imparting devices such as resistor heaters or piezoelectric devices which upon activation cause ink to be ejected through orifice holes in a nozzle plate attached to the top surface 30 of the semiconductor chip 20.

A nozzle plate, preferably a separate plastic or metal member, may be adhesively attached to the semiconductor chip 20 in a window of a flexible circuit or TAB circuit. Alternatively, the nozzle plate may be integral with a flexible circuit or TAB circuit. The adhesive used to attach the nozzle plate to the semiconductor chip 20 may be a heat curable adhesive such a B-stageable thermal cure resin, including, but not limited to phenolic resins, resorcinol resins, epoxy resins, ethylene-urea resins, furane, resins, polyurethane resins and silicone resins. The adhesive between the nozzle plate and chip 20 is preferably cured before attaching the chip 20 to the chip pocket 12 of the pen body 10 and preferably has a thickness ranging from about 1 to about 25 microns.

The flexible circuit or TAB circuit may be separate or integral with the nozzle plate and contains electrical traces and contacts for electrically connecting the energy imparting devices on the top surface 30 of the chip 20 with a printer control system. The design and manufacture of nozzle plates and flexible circuits or TAB circuits and attachment of the nozzle plates to a semiconductor chip are well known in the art and are described, for example in U.S. Pat. No. 5,305,015 to Schantz et al., the disclosure of which is incorporated by reference as if fully set forth herein.

Because of the attachment of two or more semiconductor chips 20 to chip pockets 12, 14 and 16 on a single ink jet pen body 10, each of the chips 20 must be precisely aligned with respect to one another during the assembly process. Misalignment may cause improper ink dot placement with respect to one or more colors being printed.

Figure 3:
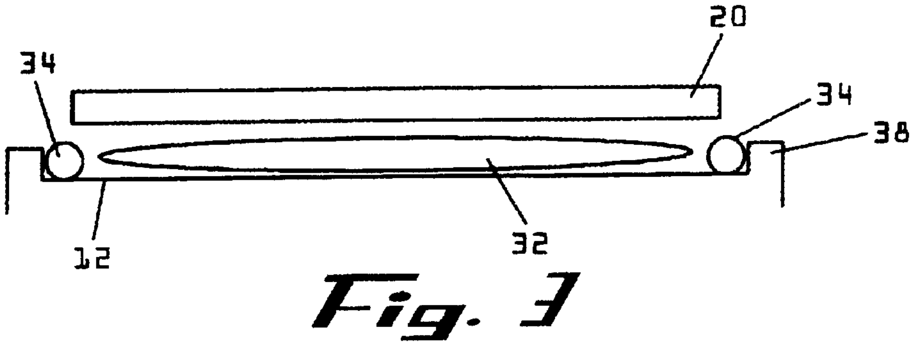
FIG. 3 is a cross-sectional view, not to scale of adhesive placement relative to a semiconductor chip and chip pocket according to the invention.

With reference to FIGS. 2 and 3, a die attach adhesive 32 such as an epoxy resin or a resin filled with thermal conductivity enhancers such as silver, silicon nitride or boron nitride may be used to fixedly attach the chip 20 in the chip pocket 12. A preferred die attach adhesive 32 is POLY-SOLDER LT available from Alpha Metals of Cranston, R.I. Another preferred die attach adhesive 32 is an adhesive containing boron nitride fillers and available from Bryte Technologies of San Jose, Calif. under the trade designation G0063. The thickness of adhesive 32 preferably ranges from about 0.001 inch to about 0.010 inch.

Figure 4:
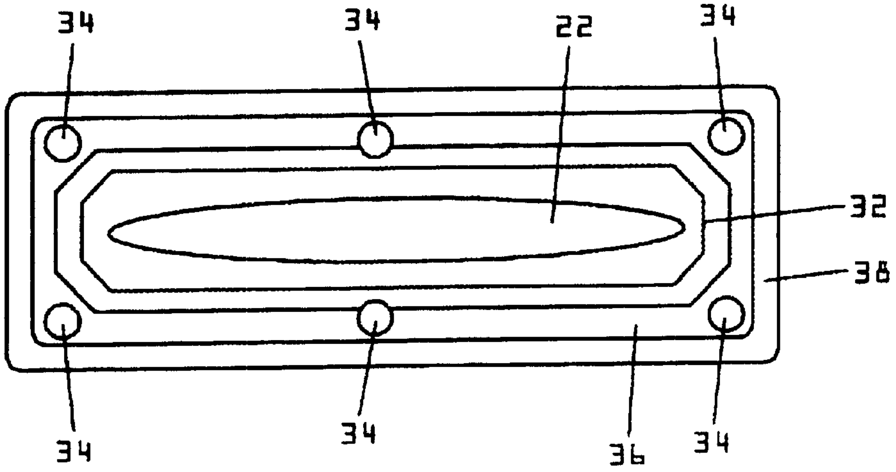
FIG. 4 is a plan view of a chip pocket showing adhesive placement according to the invention.

The die attach adhesive 32 must be precisely dispensed in the chip pocket 12 so that it does not overflow or fill the ink feed slot 22 (FIG. 4). It is preferred to dispense the die attach adhesive 32 to the chip pocket 12 so that it circumscribes the ink feed slot 22. In the case of a metal pen body 10 for conductive transfer of heat from the semiconductor chips 20, it is preferred to use a heat conductive die attach adhesive 32 containing heat conductive fillers such as described above and an amount of adhesive 32 sufficient to provide effective heat transfer from the chips 20 to the pen body 10. A preferred method for dispensing a suitable amount of die attach adhesive 32 in the chip pocket 12 includes use of an automatic adhesive dispense unit such as a needle dispense unit available from Speedline Technologies, Inc. of Franklin, Mass. under the trade name CAMALOT. The preferred amount of die attach adhesive ranges from about 5 milligrams to about 25 milligrams for seating a chip measuring from about 3.5 to about 4.5 mm wide, from about 16 to about 17.5 mm long and from about 0.6 to about 0.65 mm thick in a pocket 12 having dimensions ranging from about 4.5 to about 7.5 mm wide, from about 17 to about 18 mm long and from about 0.58 to about 0.62 mm deep.

After dispensing the die attach adhesive 32 in the chip pocket 12, the chip/nozzle plate assembly is aligned to the adjacent chips 20 and disposed in the chip pocket 12 in bonding relationship therewith. However, conventional die attach adhesives 32 often require long thermal cure times and during such cure may go through a phase and viscosity change whereby a potential exists for chip movement causing misalignment relative to the adjacent chips 20.

In order to maintain alignment between the chips 20 while the die attach adhesive 32 is curing, beads of a second adhesive 34 are preferably dispensed in two or more discrete locations around an inside perimeter 36 of each chip pocket 12 generally between the die attach adhesive 32 and raised walls 38 of the chip pocket. It is preferred to use at least two beads of the second adhesive 34, with the beads positioned in the chip pocket 12 on the longitudinal ends of the chip pocket 12 or on opposing sides of the chip pocket 12 perpendicular to the longitudinal dimension thereof. It is particularly preferred to use multiple beads of the second adhesive 34 as shown in FIG. 4 to maintain the chip 20 in alignment until the die attach adhesive has completely cured. The exact placement of beads of the second adhesive 34 is not critical to the invention provided the beads are sufficient to tack and hold the chip in alignment until the die attach adhesive is completely cured.

Figure 5:
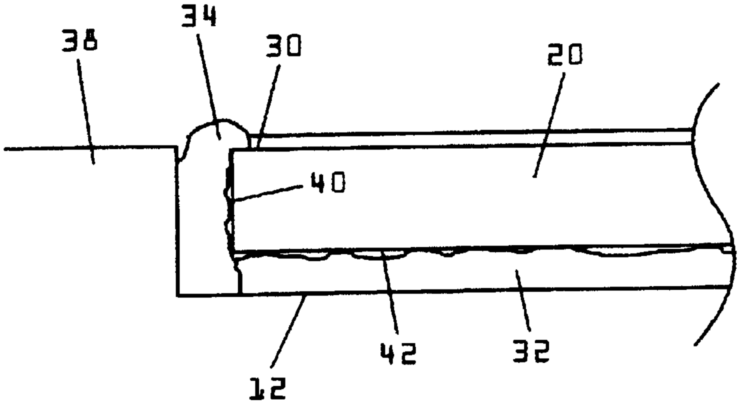
FIG. 5 is an enlarged cross-sectional view not to scale of a semiconductor chip and a chip pocket containing adhesive according to the invention.
Figure 6:
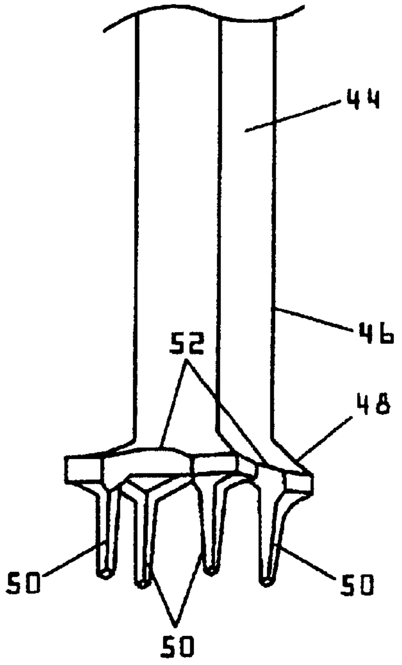
FIG. 6 is a perspective view not to scale of a glue pin according to the invention.

It is also preferred that the second adhesive be dispensed in an amount sufficient to substantially encapsulate ends 40 and sides of the chip 20 as illustrated in FIG. 5. Accordingly, the bead size of the second adhesive 34, the size of the chip 20 and the dimensions of the chip pocket 12 enable a three dimensional bond between the chip 20 and chip pocket 12. The second adhesive 34 therefore is applied so as to be substantially continuous from a bottom surface 42 of the chip 20 to the top surface 30 of the chip 20 thereby substantially encapsulating the sides of the chip, such as side 40, and filling a gap ranging from about 0.1 to about 1 millimeter between the walls 38 of the chip pocket 12 and the chip 20. Upon placement of the chip 20 in the chip pocket 12, the adhesives 32 and/or 34 are displaced to substantially fill the area between the edges of the chip 20 and the side walls 38 of the chip pocket. By providing substantially continuous adhesive material between the chip 20, the chip pocket 12 and pocket walls 38, a substantially contiguous path for conduction of heat from the chip 20 to the pen body 10 is established thereby aiding in the adhesive curing step.

The second adhesive 34 is preferably selected from the group consisting of heat curable adhesives, radiation curable adhesives, pressure sensitive adhesives and hot melt adhesives and has a bond time or cure time substantially shorter than the cure time of the die attach adhesive. The phrase "substantially shorter" means that the cure time of the second adhesive is preferably less than about 10 seconds, most preferably less than about 5 seconds. The most preferred second adhesive 34 is selected from UV and heat curable epoxy adhesives such as the adhesives available from Electronic Materials, Inc. of Breckenridge, Colo. under the trade names EMCAST 1070 series and EMCAST 700 series.

As described above, the amount of second adhesive 34 dispensed in the chip pocket 12 is preferably sufficient to achieve the previously described advantages of the invention. Accordingly, each bead of second adhesive 34 preferably has a diameter ranging from about 300 to about 800 microns, a height ranging from about 50 to about 500 microns and a length ranging from about 0.25 to about 1 millimeter. Beads of these dimensions preferably have a height to width ratio of from about 0.12:1 to about 1.667:1.

In order to provide beads of the second adhesive 34 with the desired dimensions, an adhesive transfer pin 44 having an elongate shaft 46 terminating in a widened flange 48 is provided. Attached to the flange 48 are two or more elongate projections 50 which are appended near the outside dimensional area of the flange 48. The overall length of the adhesive transfer pin 44 ranges from about 5 millimeters to about 20 millimeters, the shaft having a width ranging from about 1.5 millimeters to about 3 millimeters and each of the projections have a length ranging from about 0.5 millimeters to about 3.0 millimeters and an average width ranging from about 0.2 millimeters to about 1.5 millimeters. It is preferred that the adhesive transfer pin 44 also include recessed portions 52 in the flange 48 between each projection 50. The pin 44 is preferably made of steel.

Figure 7:
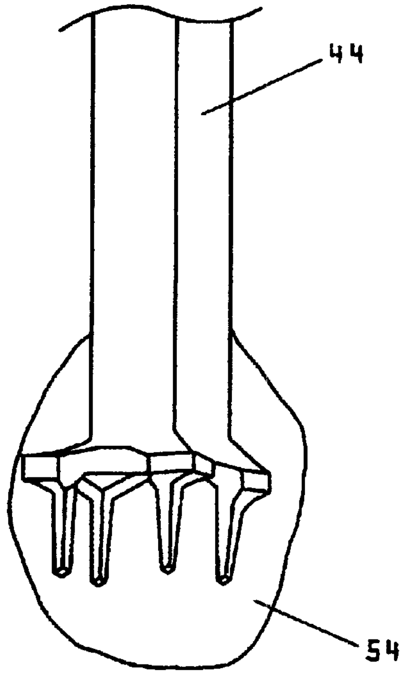
FIG. 7 is a perspective view of a glue pin according to the invention containing a glue bead.
Figure 8:
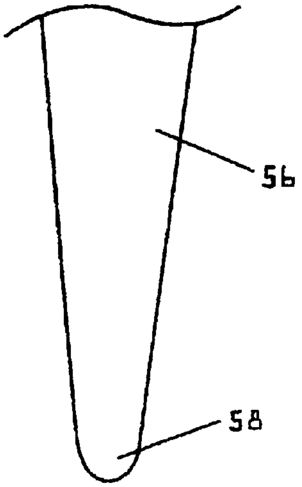
(Prior Art) Fig. 8
FIG. 8 is an elevational view of a prior art glue pin.
Figure 9:
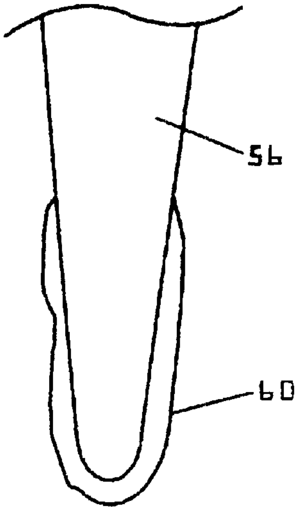
(Prior Art) Fig. 9
FIG. 9 is an elevational view of a prior art glue pin containing a glue bead.

As shown in FIG. 7, an adhesive transfer pin 44 of the above described design is effective for obtaining a bead 54 of adhesive which is suitable for providing beads of the second adhesive 34 having the desired dimensions. The bead 54 of adhesive is obtained by dipping the flange end of the adhesive transfer pin 44 in an adhesive container to a depth sufficient to withdraw the bead 54 of adhesive. For comparison purposes reference is made to FIGS. 8 and 9 which illustrate the design of a prior art adhesive transfer pin 56 which has a 1 millimeter tip 58 with a 15° included angle. The overall pin height is about 5 millimeters and delivers an adhesive bead 60 having the dimensions of 0.6 millimeters in diameter and 0.06 millimeters high having a height to width ratio of about 0.1:1. By contrast, the bead of adhesive 54 delivered by pin 44 has a diameter of about 2.4 millimeters and a height of about 0.3 millimeters using an adhesive having a viscosity ranging from about 40,000 to about 70,000 centipoise as measured on a BROOKFIELD Viscometer at a shear rate of about 40 $sec^{-1}$ at 25° C.

Other mechanisms for dispensing beads of adhesive 34 in the chip pocket 12 include, but are not limited to pneumatic adhesive dispensing jets which may be adjusted to apply beads of adhesive having the desired dimensions in precise locations. One particularly preferred dispensing jet system is available form Nordson Corporation of Amherst, Ohio under the trade name ACCUJET adhesive dot system.

After the beads of adhesive 34 are dispensed, the chips 20 are secured to the adhesive 34 before the chip assemblies are heated to cure the die attach adhesive 32. Accordingly, a precise localized delivery of heat is delivered to the adhesive bead locations, preferably by use of a focussed infrared (IR) laser beam which is made to impinge on the beads of adhesive 34. The focussed IR beam provides a high heat flux rate that causes rapid heating of the beads of adhesive 34 while generating very little heat in the body of the chip 20.

A variety of laser heating sources such as a Nd:YAG laser, a $CO_2$ laser, a solid state diode laser and the like may be used. The preferred apparatus for heating adhesive 34 is a solid state diode laser such as a laser available from Opto Power Corporation of Tucson, Ariz. under the trade name OPC-H005-FCTS.

When heating of the pen body 12 is not desired, an alternative method for curing adhesive 34 is by means of a radio frequency (RF) heating source. RF coils may be placed in close proximity to the pen body and provide localized heating of the adhesive and body. Suitable RF heating sources are available from Ameritherm Corporation of Rochester, N.Y.

Once the chip/nozzle plate assembly is attached to the pen body 10, the flexible circuit or TAB circuit 26 is attached to the top surface 18 of the pen body 10 using a heat activated or pressure sensitive adhesive. Preferred adhesives include, but are not limited to phenolic butyral adhesives, acrylic based pressure sensitive adhesives such as AEROSET 1848 available from Ashland Chemicals of Ashland, Ky. and phenolic blend adhesives such as SCOTCH WELD 583 available from 3M Corporation of St. Paul, Minn. The adhesive thickness preferably ranges from about 0.001 inch to about 0.010 inch.

In a preferred fabrication method for an ink jet pen according to the invention, first nozzle plates are bonded to semiconductor chips such as chip 20 using well known bonding techniques. The nozzle plate/chip assemblies are then electrically connected to a flexible circuit or TAB circuit. In a separate step, a thermoplastic adhesive is applied to the top surface 18 of the pen body 10 (FIG. 1). A die attach epoxy adhesive 32 and a UV curable second adhesive 34 are dispensed in the chip pockets 12 of the pen body 10. The nozzle plate/chip/circuit assemblies are aligned to one another and attached to the pen body 10 and the adhesive 32 is cured in an oven. The plate/chip/circuit assemblies may be held in place by use of a fast cure UV curable adhesive 34 until the adhesive 32 is cured. Finally, the flexible circuits or TAB circuits are bonded to the pen body 10 by use of the thermoplastic adhesive on the surface 18 of the pen body 10 and heat is applied to the exposed surface of the flexible circuits in an amount sufficient to cause the thermoplastic adhesive to flow and bond to the surface 18.

In accordance with the invention, a particularly preferred thermoplastic adhesive for attaching the flexible circuits or TAB circuits is in the form of an adhesive film which may be applied to the top surface 18 of the pen body 10 before attaching the plate/chip/circuit assemblies to the body 10. The adhesive film is preferably a flexible modified polyolefin, non-curing thermoplastic bonding film such as available from Minnesota Mining and Manufacturing Company of Saint Paul, Minn. under the trade name 3M THERMO-BOND 845. Such film has a thickness ranging from about 0.002 inches to about 0.005 inches and includes a polyolefin based-resin having a softening point in the range of from about 80° to about 150° C.

Under heat and pressure of from about 5 to about 60 psig, the film is caused to soften and flow thereby bonding the flexible circuits to the pen body 10. Such a film is particularly useful for pen bodies 10 which are made of polymeric materials such as polyphenylene oxide available from General Electric company of New York, N.Y. under the trade name NORYL having a softening point of from about 130° to about 150° C. In the case of pen bodies 10 made of a higher temperature polymer or metal, a higher softening temperature thermoplastic film such as a polyurethane ether, non-curing thermoplastic bond film available from Deerfield Urethane, Inc. of South Deerfield, Mass. under the trade name DEERFIELD PT 9300 having a softening point in the range of from about 150° to about 250° C. under a pressure of about 10 to about 100 psig may be used as film.

It is preferred that the film not be tacky at room temperature because the alignment of the chips 20 to the pen body 10 is critical to the proper functioning of the ink jet pen. Accordingly, as described above, the nozzle plate/chip/flexible circuit assembly is aligned and placed on the printhead body 10 in the chip pockets 12 and the chip adhesives 32 and 34 are cured prior to bonding the flexible circuits to surface 18 of the pen body 10.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for assembling a multi-color ink jet pen which comprises:

providing an ink jet pen body containing two or more semiconductor chip pockets;

dispensing a die attach adhesive in a predetermined pattern in each of the chip pockets, the die attach adhesive having a first cure time greater than about 15 minutes;

dispensing beads containing a second adhesive in two or more discrete locations around an inside perimeter of each chip pocket adjacent the die attach adhesive, the second adhesive having a second cure time substantially shorter than the first cure time of the die attach adhesive;

attaching to the die attach adhesive and second adhesive in each of the chip pockets a semiconductor chip having chip edges and having a flexible circuit or TAB circuit attached to the chip;

curing the second adhesive to hold the chips in a predetermined alignment;

curing the die attach adhesive using heat or radiation;

attaching the flexible circuit or TAB circuit to the ink jet pen body; and attaching one or more removable cartridges containing ink to the pen body.

2. The method of claim 1 wherein the second adhesive is selected from the group consisting of a heat curable adhesive, a radiation curable adhesive, a pressure sensitive adhesive and a hot melt adhesive.

3. The method of claim 1 wherein the adhesive beads of the second adhesive have a diameter ranging from about 300 to about 800 microns.

4. The method of claim 3 wherein the adhesive beads have a height ranging from about 50 to about 500 microns.

5. The method of claim 4 wherein the adhesive beads have a length ranging from about 0.25 to about 1 millimeter.

6. The method of claim 1 wherein the chip is attached in the chip pocket such that the die attach adhesive is displaced and encapsulates the chip edges.

7. The method of claim 1 wherein a multi-fingered glue pin applies beads of the second adhesive to the chip pocket in the discrete locations.

8. The method of claim 1 wherein a pneumatic ink jet dispense unit applies beads of the second adhesive to the chip pocket in the discrete locations.

9. The method of claim 1 wherein the die attach adhesive is displaced in the chip pocket by the chip to fill voids in the pocket between the chip and sidewalls of the pocket.

10. The method of claim 1 wherein the chip is attached in the chip pocket such that the second adhesive is displaced and encapsulates the chip edges.

11. The method of claim 1 wherein the adhesive beads have a height to width ratio of from about 0.12:1 to about 1.667:1.

12. A multi-color ink jet pen made by the method of claim 1.

* * * * *